March 17, 1970   H. B. SMITH   3,500,549
METHOD AND APPARATUS FOR DETERMINING STRESSES AND DEFORMATIONS
Filed Sept. 23, 1968   2 Sheets-Sheet 2

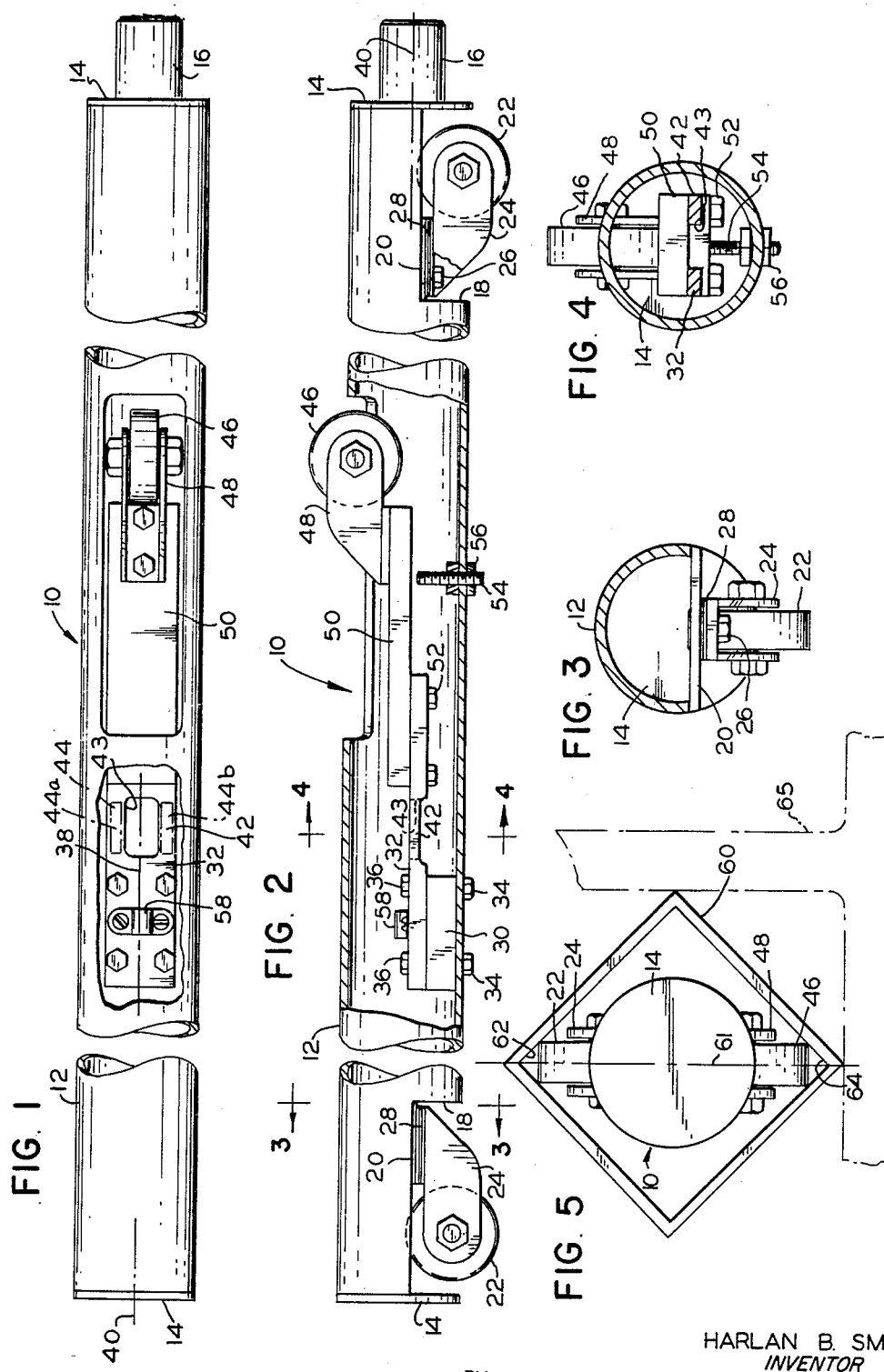

HARLAN B. SMITH
INVENTOR
BY
BUCKHORN, BLORE, KLARQUIST & SPARKMAN
ATTORNEYS 3,500,549
METHOD AND APPARATUS FOR DETERMINING STRESSES AND DEFORMATIONS
Harlan B. Smith, Albany, Oreg., assignor to Cornell, Howland, Hayes and Merryfield, Inc., Corvallis, Oreg., a corporation of Oregon
Filed Sept. 23, 1968, Ser. No. 761,478
Int. Cl. G01b 7/16
U.S. Cl. 33—174                14 Claims

---

ABSTRACT OF THE DISCLOSURE

A method of determining bending stresses in a structural member in which a square tube is attached to the member with a diagonal plane parallel to the plane of bending of the structural member, the tube being adapted to assume the curvature of the member during the bending thereof. A curvature meter in inserted in the tube. The meter has a tubular body and supporting rollers mounted at each end thereof. A third or sensing roller is mounted on a cantilever midway between the end rollers. The meter is inserted in the tube so that the end rollers ride in one apex thereof and the sensing roller rides in the opposite apex. Strain gauges mounted on the cantilever record the deflection thereof, which deflection can then be used to compute the stress in the structural member.

BACKGROUND OF THE INVENTION

This invention relates to the determination of bending stresses, and more particularly, to a method and apparatus for determining such stresses in slender structural members such as beams, columns, slabs and piling.

The general equation of the elastic curve of a beam assumed to be subjected to pure bending—that is, a beam in which shearing deformation is assumed to be negligible—can be expressed as $$M = EI \frac{d^2y}{dx^2} \quad \text{(I)}$$

where
M = applied bending moment
E = modulus of elasticity of the structural member
I = moment of inertia of the structural member, and
$x$, $y$ = the rectangular coordinates of the elastic curve.

The radius of curvature, R, for beams that are not deflected more than is usual in structural and machine members, may be expressed as $$\frac{1}{R} = \frac{d^2y}{dx^2} \quad \text{(II)}$$

Considering any three points along the elastic curve of a structural member wherein one such point is equidistant from the other two, and letting $y$ equal the deflection of the midpoint with respect to a line drawn through the two equidistant points, the slope of the elastic curve between the first two points may be expressed as $$\frac{dy}{dx} = \frac{y}{L}$$

and that of the elastic curve between the last two points as $$\frac{dy}{dx} = -\frac{y}{L}$$

where L is the distance between either end point and the midpoint.

The rate of change of slope in the member may then be expressed as $$\frac{d^2y}{dx^2} = \frac{2}{L}\frac{dy}{dx} = \frac{2y}{L^2} \quad \text{(III)}$$

Thus $$\frac{1}{R} = \frac{2y}{L^2} \quad \text{(IV)}$$

and $$M = EI \frac{2y}{L^2} \quad \text{(V)}$$

The flexure formula expresses the applied bending moment as $$M = \frac{SI}{c} \quad \text{(VI)}$$

where

S = normal unit stress on the outermost fiber, that is, the maximum bending stress, and
c = distance from the neutral axis to the outermost fiber.
Thus, $$\frac{SI}{c} = EI \frac{2y}{L^2} \quad \text{(VII)}$$

and $$S = Ec \frac{2y}{L^2} \quad \text{(VIII)}$$

SUMMARY OF THE INVENTION

The primary object of the present invention is to provide a method and apparatus for determining bending stresses in slender structural members which will utilize the aforesaid relationship $$S = Ec \frac{2y}{L^2}$$

A square tube is attached to a structural member which undergoes bending deflection with a diagonal plane of the tube parallel to the plane of bending of the structural member. A curvature meter is inserted in the tube to measure the deflection of a first point along one apex thereof with respect to a line drawn through two equidistant points along the opposite apex and on either side of the first point. The bending stress in the structural member can then be computed as a function of this deflection using the above formula.

The curvature meter itself comprises an elongated body having two supporting members disposed on one side thereof one at each end. The supporting members are adapted to ride in one apex of the tube. A sensing member is disposed midway between the supporting members and is adapted to ride in the opposite apex of the tube. Means are provided to measure the deflection of the sensing member with respect to a line drawn through the points of contact of the supporting members with the opposite apex.

BRIEF DESCRIPTION OF THE DRAWINGS

FIG. 1 is a plan view with parts broken away of the curvature meter of the present invention.

FIG. 2 is a side elevational view partly in section of the curvature meter shown in FIG. 1.

FIG. 3 is a sectional view taken on line 3—3 of FIG. 2.

FIG. 4 is a sectional view taken on line 4—4 of FIG. 2.

FIG. 5 is a sectional view showing the curvature meter of the present invention inserted in a square tube and in position to measure deflections along a structural member attached to the tube.

DESCRIPTION OF THE PREFERRED EMBODIMENTS

Figure 7:
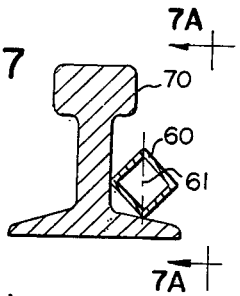
FIG. 7 is a sectional view showing the tube of the present invention attached to a crane or train rail.

Referring to the drawings and in particular to FIGS. 1–4 thereof, the curvature meter 10 consists of a tubular body 12 closed at each end by circular plates 14 to one of which plates a suitable positioning and electrical cable (not shown) is attached by means of a fitting 16. Each end of the body 12 is cut out as at 18 to support a bearing plate 20 on which is attached a supporting roller 22 journaled in a bracket 24 attached to the plate 20 by screws 26. A shim 28, inserted between the bracket 24 and the plate 20, is used to adjust the transverse position of each roller 22.

A support block 30 and a cantilever beam 32 are mounted in the tubular body 12 intermediate its ends. The block 30 is attached to the body 12 by cap screws 34 and the beam 32 is attached to the block 30 by cap screws 36. The cantilever beam 32 is mounted such that its axis 38 lies parallel to the axis 40 of the tubular body 12. The cantilever 32 is cut out as at 43 to provide a portion 42 of reduced cross sectional area adjacent the support block 30 on which portion 42 four strain gauges 44 are mounted, two on top (44a and 44b) and two on bottom (not shown).

A third or sensing roller 46 is journaled in a bracket 48 attached to an extension member 50 attached to the cantilever 32 adjacent the portion 42 by screws 52. The roller 46 is located so that its position is exactly midway between the supporting rollers 22. By this construction it is seen that lateral deflection of the sensing roller 46 with respect to the supporting rollers 22 cause bending of the cantilever 32 to be localized substantially in the reduced cross-sectional area portion 42, thereby to facilitate accurate measurement of the deflection by the strain gauges 44.

Figure 14:
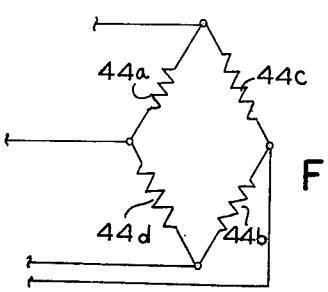
FIG. 14 is a circuit diagram showing the electrical connections to the strain gauges.

A set screw 54 positioned by lock nuts 56 is provided to prevent excessive deflection of the sensing roller 46 and consequent damage to the cantilever beam 32. A cable clamp 58 attached to the cantilever 32 serves as a guide and protection for the electrical wires leading to the strain gauges 44. FIG. 14 illustrates the circuit diagram by which the four strain gauges 44a, 44b, 44c and 44d are connected to a strain gauge indicator (not shown).

FIG. 5 illustrates the curvature meter 10 inserted in the square tube 60 which is attached to a structural member in which the bending stresses are desired to be measured. The tube 60 is oriented so that a diagonal plane 61 is parallel to the plane of bending of the structural member. The curvature meter 10 is inserted in the tube 60 so that the supporting rollers 22 ride in the apex 62 thereof and the sensing roller 46 in the opposite apex 64.

Figure 6:
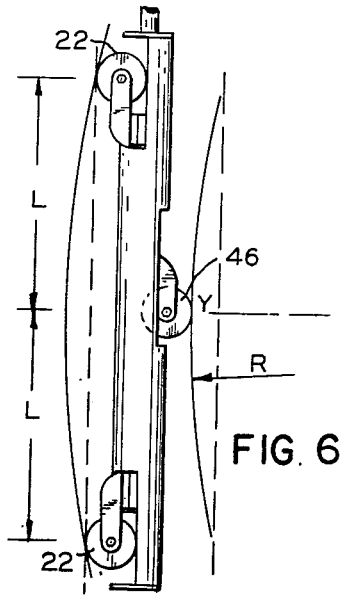
FIG. 6 is a schematic view showing the curvature meter in a square tube measuring the deflection of a point with respect to a line drawn through two equidistant points.

Referring to FIG. 6, the indicator to which the strain gauges 44 are connected is suitably calibrated to measure the deflection $y$ with respect to a line drawn through the points of contact of the supporting rollers 22 with the apex 62 of the tube 60. Since the point of contact of the sensing roller 46 in equidistant from the points of contact of the supporting rollers 22, the maximum bending stress in the structural member 65 may be computed from the formula $$S = Ec\frac{2y}{L^2} \qquad \text{(VIII)}$$

In using the curvature meter of the present invention, a shim is positioned under one of the rollers so that the sensing roller 46 is always deflected when the instrument is inserted in the tube 60. A set of readings is taken with the meter in the tube, the meter is then withdrawn, rotated 180 degrees about its longitudinal axis 40, inserted in the tube 60 a second time, and another set of readings is taken. The difference between the deflections obtained in the forward and reverse positions cancels out the effect of the shim and is used to compute the stress of the structural member. Any long term drift of the deflection measuring means of the instrument is eliminated by this procedure.

Use of the apparatus of the present invention permits a numerical check to be obtained on the readings. The sum of the deflections obtained in the forward and reverse positions remains a constant irrespective of variations in loading on the structural member, and this constant can be used as a check to eliminate errors.

Other means besides strain gauges can be used to measure the deflection of cantilever beam 32 as the sensing roller 46 contacts the apex 64 of the tube 60. Such means include variable resistors, linear variable differential transformers, and variable capacitors. With any such means, location thereof within the tubular body 12 protects the instrumentation from physical damage.

The tube 60 may be attached to structural members in a variety of ways. Examples are shown in FIGS. 7–13. In each case, the tube 60 is attached to the structural member with the longitudinal axis of the tube parallel to the longitudinal axis of the structural member such that the tube can assume the curvature of the structural member during bending thereof.

Figure 8:
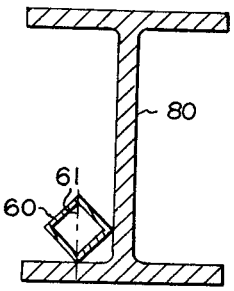
FIG. 8 is a sectional view showing the tube attached to a steel bearing pile.
Figure 9:
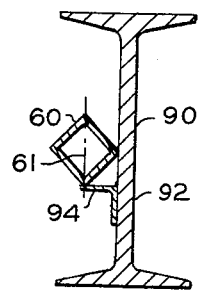
FIG. 9 is a sectional view showing the tube attached to an I-beam.
Figure 7A:
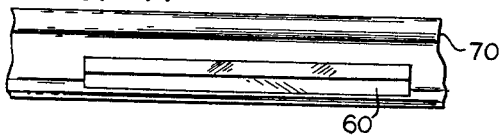
FIG. 7A is a sectional view taken on line 7A—7A of FIG. 7.
Figure 13:
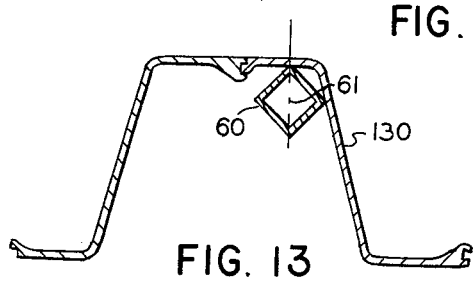
FIG. 13 is a sectional view showing the tube attached to a section of steel sheet piling.

FIG. 7 illustrates the tube 60 attached to the side of a crane or train rail 70. FIG. 8 illustrates the tube 60 welded to the side of a steel bearing pile 80. FIG. 9 illustrates the tube 60 attached to an I-beam 90 by being welded to the web 92 thereof and to a supporting angle 94 attached to the web. FIG. 13 illustrates the tube 60 welded to a section of sheet steel piling 130.

Figure 10:
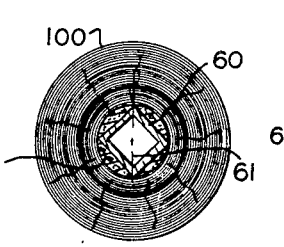
FIG. 10 is a sectional view showing the tube embedded in a wood pile.
Figure 11:
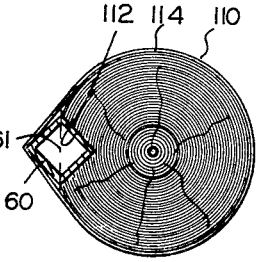
FIG. 11 is a sectional view showing the tube partially embedded in the side of a wood pile.
Figure 12:
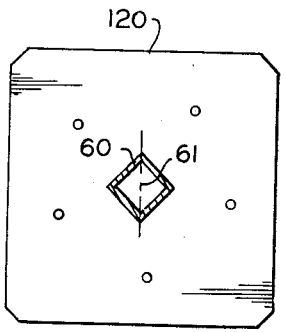
FIG. 12 is a sectional view showing the tube embedded in a concrete pile.

The tube 60 may also be embedded within the structural member as shown in FIGS. 10–12. FIG. 10 illustrates the tube 60 embedded in the interior of a wood pile 100. The pile is first drilled as at 102, and the tube 60 is then grouted in place. FIG. 11 illustrates the tube 60 partially embedded in a wood pile 110. The side of the pile 110 is first notched as at 112, the tube 60 is partially embedded therein and is held in place by a steel band 114. FIG. 12 illustrates the tube 60 cast in place in the center of a concrete pile 120.

In determining stresses in structural members in which the plane of bending is indeterminate, as in the members 100, 110 and 120 of FIGS. 10, 11 and 12, respectively, measurements are taken with the curvature meter 10 oriented with its rollers in one pair of opposite apexes. The meter is then withdrawn, rotated 90 degrees about its longitudinal axis 40, inserted in the tube again and measurements taken in the pair of apexes lying in the plane at right angles to the first pair. Maximum bending stresses in the structural members can then be obtained from the two sets of data using known computational techniques.

The present invention achieves other advantages than those heretofore mentioned. One curvature meter can be used to monitor a large number of structural members, each of which need only be provided with an attached tube. The cost of instrumenting a beam is thus much less than with prior methods.

The present invention also is insensitive to small amounts of vibration. For example, pile driving in the general vicinity will not affect the system of the present invention.

The apparatus of the present invention measures an average stress over the length of the curvature meter, rather than a localized stress on the surface of the beam, which is all that can be achieved using conventional strain gauges.

A further advantage of the present invention resides in the fact that the curvature meter itself can be removed, calibrated and repaired. The only part of the system that is permanently attached to the structural member is the tube.

The location of the delicate instrumentation in the present invention is inside the body portion of the curvature meter. thereby to protect the same from physical damage. The apparatus of the present invention has no moving parts with tolerances which can affect readings other than the rollers themselves. Such may be ball bearings having a very small eccentricity, thereby to insure a high level accuracy.

The curvature meter of the present invention requires only three supporting points, namely, two supporting members on one side and a sensing member on the other. Minimizing the number of contact points obviously improves the accuracy of the apparatus.

A further advantage of the present invention is that the combination of the curvature meter with the tube prevents the meter from being rotated into positions other than the one actually desired. The supporting and sensing rollers fit into the apexes of the tube so that the curvature meter is oriented in a precise manner. The wheels fit into one, and only one, spot in the tube, unlike other systems for orienting wheeled instruments wherein the contacts have some degree of lateral movement. Having the supporting and sensing members ride within the apexes of the square tube prevents the instrument from rotating as a deflection reading is being taken.

In the foregoing description, the invention has been described with reference to certain particular preferred embodiments, although it is to be understood that the specific details shown are merely illustrative and the invention may be carried out in other ways without departing from the true spirit and scope of the following appended claims.

What is claimed is:

1. A method of determining bending stresses in a structural member comprising:

attaching a square tube to said structural member with a diagonal plane of said tube parallel to the plane of bending of said structural member, said tube being adapted to assume the curvature of said structural member during bending thereof;

measuring the deflection of a first point along one apex of said tube with respect to a line drawn through two equidistant points along the opposite apex of said tube and on either side of said first point; and computing the stress in said member as a function of said deflection.

2. In the method of claim 1 inserting a curvature meter in said tube, said meter comprising an elongated body having two supporting members disposed on one side of said body one at each end, said supporting members being adapted to ride in said opposite apex of said tube, a sensing member disposed midway between said supporting members and adapted to ride along said one apex of said tube, and measuring the deflection of said sensing member at said point of contct of said sensing member with said one apex with respect to a line drawn through the points of contact of said supporting members with said opposite apex.

3. The method of claim 2 in which said supporting members each comprise a wheel mounted at the end of said body.

4. The method of claim 2 in which said sensing member comprises a spring biased roller.

5. The method of claim 2 further comprising withdrawing said curvature meter from said tube, rotating said meter 180° about its longitudinal axis, inserting said meter in said tube a second time, measuring the deflection of said tube at said point of contact of said sensing member with respect to a line drawn through the point of contact of said supporting members while said meter is inserted said second time, obtaining the difference between the second deflection and the first deflection, and computing the stress in said member as a function of said difference in deflections.

6. The method of claim 1 in which said tube is attached to the side of said structural member.

7. The method of claim 1 in which said tube is embedded within said structural member.

8. In a gauge for measuring the bending stress of a structural member, the combination of:

a square tube attached to said structural member with a diagonal plane of said tube parallel to the plane of bending of said structural member, said tube being adapted to assume the deformation of said structural member during bending thereof; and a curvature meter inserted within said tube, said meter comprising an elongated body member adapted to traverse within said tube, a supporting member disposed at each end of said body member, said supporting members being adapted to ride along one apex of said tube, sensing means disposed midway between said supporting members, said sensing means being adapted to ride along the opposite apex of said tube, and means to measure the deflection of said sensing means as it contacts said opposite apex.

9. The combination of claim 8 in which said supporting members comprise a roller mounted at each end of said body member.

10. The combinatioon of claim 9 in which said sensing means comprises a support mounted within said tubular body member, a cantilever beam mounted on said support within said body member and with its axis parallel to the axis of said body member, and a roller mounted on the free end of said cantilever beam.

11. The combination of claim 10 in which said deflection measuring means comprises a strain gauge mounted on said cantilever beam.

12. The combination of claim 11 in which said cantilever beam is provided with a reduced cross-sectional area portion adjacent said support therefor, said strain gauge being attached to said portion.

13. A method of measuring deformations in a body comprising
   inserting a square tube in said body with a diagonal plane of said tube parallel to the plane in which the deformation in said body is to be measured, said tube being adapted to assume the deformation of the body; and
   measuring the deformation of one of the apices of said tube in said diagonal plane.

14. The method of claim 13 in which said tube is attached to said body.

References Cited

UNITED STATES PATENTS 2,121,614  6/1938  Stark.
2,495,797  1/1950  Whitlock et al.
2,499,033  2/1950  Oberholtzer.

SAMUEL S. MATTHEWS, Primary Examiner